US009501059B2

(12) United States Patent
Hutson (10) Patent No.: US 9,501,059 B2
(45) Date of Patent: Nov. 22, 2016

(54) POCKET ROBOT (71) Applicant: QUALCOMM Incorporated, San Diego, CA (US)

(72) Inventor: Donald Bolden Hutson, San Diego, CA (US)

(73) Assignee: QUALCOMM INCORPORATED, San Diego, CA (US)

( * ) Notice: Subject to any disclaimer, the term of this patent is extended or adjusted under 35 U.S.C. 154(b) by 8 days.

(21) Appl. No.: 14/485,603

(22) Filed: Sep. 12, 2014

(65) Prior Publication Data
US 2016/0077527 A1 Mar. 17, 2016

(51) Int. Cl.
| | | |
|---|---|---|
| G05D 1/02 | (2006.01) | |
| B25J 9/16 | (2006.01) | |
| B25J 11/00 | (2006.01) | |
| H04M 1/04 | (2006.01) | |
| B25J 5/00 | (2006.01) | |
| H04M 1/725 | (2006.01) | |

(52) U.S. Cl.
CPC .............. *G05D 1/0246* (2013.01); *B25J 5/00* (2013.01); *B25J 9/1697* (2013.01); *B25J 11/0005* (2013.01); *G05D 1/0225* (2013.01); *H04M 1/04* (2013.01); *H04M 1/72527* (2013.01)

(58) Field of Classification Search
CPC . G05D 1/0246; G05D 1/0225; B25J 9/1697; B25J 11/0005; B25J 5/00; H04M 1/0214; H04M 1/04; H04B 1/3888
See application file for complete search history.

(56) References Cited

U.S. PATENT DOCUMENTS

| | | | | |
|---|---|---|---|---|
| 5,940,502 | A * | 8/1999 | Hirai | B60R 11/0241 379/446 |
| 7,441,341 | B2 * | 10/2008 | Eaton | G01B 5/004 33/1 M |
| D597,091 | S * | 7/2009 | Varela | D14/346 |
| 8,380,348 | B2 * | 2/2013 | Neki | B25J 19/005 219/125.1 |
| 8,588,972 | B2 | 11/2013 | Fung | |
| 8,600,603 | B2 * | 12/2013 | Park | G06K 9/00691 701/23 |
| 2005/0222713 | A1 * | 10/2005 | Kawabe | B25J 19/027 700/259 |
| 2008/0129829 | A1 * | 6/2008 | Shin | H04N 5/23248 348/208.1 |
| 2010/0152945 | A1 * | 6/2010 | Park | G06K 9/00691 701/28 |

(Continued)

FOREIGN PATENT DOCUMENTS

| | | |
|---|---|---|
| EP | 2556869 A1 | 2/2013 |
| JP | 2004080147 A | 3/2004 |

(Continued)

OTHER PUBLICATIONS

International Search Report and Written Opinion—PCT/US2015/045902—ISA/EPO—Dec. 1, 2015.

*Primary Examiner* — Rodney Butler (74) *Attorney, Agent, or Firm* — Seyfarth Shaw LLP (57) ABSTRACT

A method for controlling a mobile device includes extending a retractable mechanical actuator from a mobile device case and/or the mobile device. The method also includes manipulating an object with the retractable mechanical actuator when the retractable mechanical actuator is retracted. The retractable mechanical actuator is controlled via the mobile device.

16 Claims, 7 Drawing Sheets

(56) References Cited

U.S. PATENT DOCUMENTS

| | | |
|---|---|---|
| 2010/0171464 A1 | 7/2010 | Choi |
| 2010/0245062 A1 | 9/2010 | Shuster |
| 2012/0290111 A1 | 11/2012 | Badavne et al. |
| 2012/0315016 A1 | 12/2012 | Fung |
| 2012/0316676 A1* | 12/2012 | Fouillade ............ B25J 11/0005 700/246 |
| 2013/0186792 A1* | 7/2013 | Weisner ................ G06F 1/1628 206/320 |
| 2013/0195597 A1* | 8/2013 | Imura ..................... E02F 9/123 414/744.2 |
| 2013/0200224 A1* | 8/2013 | Bergreen ............. F16M 11/041 248/122.1 |
| 2013/0206614 A1 | 8/2013 | O'Neill et al. |
| 2013/0275011 A1* | 10/2013 | Ota ...................... E02F 9/2075 701/50 |
| 2014/0015914 A1 | 1/2014 | Delaunay |
| 2014/0124521 A1* | 5/2014 | Brown ................... H05K 5/023 220/756 |
| 2014/0197049 A1* | 7/2014 | Napolitano ............... A45F 5/02 206/45.24 |
| 2015/0148960 A1* | 5/2015 | Moore .................. B25J 9/1694 700/259 |
| 2015/0156301 A1* | 6/2015 | Crawford ............ H04B 5/0037 455/420 |
| 2015/0290803 A1* | 10/2015 | Buehler ................ B25J 9/0087 700/257 |
| 2015/0304465 A1* | 10/2015 | Sweet, III ........... H04B 1/3888 455/575.1 |
| 2015/0314449 A1* | 11/2015 | Wang .................... B25J 9/1689 700/259 |

FOREIGN PATENT DOCUMENTS

| | | | |
|---|---|---|---|
| KR | 1020060036818 A | * | 12/2012 |
| WO | 2013183861 A1 | | 12/2013 |

\* cited by examiner

POCKET ROBOT

BACKGROUND

Field

Certain aspects of the present disclosure generally relate to mobile devices, and more particularly, to systems and methods for providing a mobile device case that manipulates objects via one or more retractable actuators controlled by a mobile device.

Background

Robots, such as autonomous robots, may include a housing for a mobile device. The mobile device may be coupled to the robot and may operate as a processor for controlling the robot. That is, the robot may include a structure that is independent from the mobile device; still, the mobile device may be coupled to the body of the robot. When coupled with the robot, the mobile device controls the robot via a wired or wireless connection. Moreover, the robot may include actuators, such as legs, arms, and/or wheels to manipulate objects.

In a conventional robot, the actuators are in a fixed position. Therefore, a mobile device may not be used as a conventional device when coupled to the robot. Rather, the mobile device only acts as a processor for the conventional robot. Thus, it is desirable to provide a mobile device case that may function as a robot in one configuration while functioning as a conventional mobile device case in another configuration. It may also be desirable to integrate the actuators with the body of the mobile device.

SUMMARY

In one aspect of the present disclosure, a mobile device case is presented. The mobile device case includes a retractable mechanical actuator configured to manipulate an object, the mechanical actuator being controlled by a mobile device.

In another aspect of the present disclosure, a mobile device is presented. The mobile device includes a retractable mechanical actuator configured to manipulate an object, the mechanical actuator being controlled by a mobile device.

In one aspect of the present disclosure, a method for controlling a mobile device is disclosed. The method includes extending a retractable mechanical actuator from a mobile device case and/or the mobile device. The method also includes manipulating an object with the retractable mechanical actuator when the retractable mechanical actuator is retracted. In one configuration, the retractable mechanical actuator is controlled via the mobile device.

Another aspect of the present disclosure is directed to an apparatus including means for extending a retractable mechanical actuator from a mobile device case and/or the mobile device. The apparatus also includes means for manipulating an object with the retractable mechanical actuator when the retractable mechanical actuator is retracted. In one configuration, the retractable mechanical actuator is controlled via the mobile device.

In another aspect of the present disclosure, a computer program product for controlling a mobile device is disclosed. The computer program product having a non-transitory computer-readable medium with non-transitory program code recorded thereon which, when executed by the processor(s), causes the processor(s) to perform operations of extending a retractable mechanical actuator from a mobile device case and/or the mobile device. The program code also causes the processor(s) to manipulate an object with the retractable mechanical actuator when the retractable mechanical actuator is retracted. In one configuration, the retractable mechanical actuator is controlled via the mobile device.

This has outlined, rather broadly, the features and technical advantages of the present disclosure in order that the detailed description that follows may be better understood. Although the various aspects are directed to mobile devices, the various aspects are not limited to mobile devices and other devices, such as a mobile device case or a robotic device are also contemplated. Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

Aspects of the present disclosure are directed to a retractable mechanical actuator configured to manipulate an object, such as the mobile device case, the mobile device, and/or other object. In the present application, the mechanical actuator may be referred to as the actuator. Furthermore, the mobile device case may be referred to as the case.

The actuator may be retractable in that the actuator may retract and/or extend from the case or the mobile device. When retracted into the case or mobile device, the actuator may be housed within a specified location of the case. In one configuration, when retracted, the actuator is relatively flush with the case or mobile device. Moreover, the actuator may be controlled by the mobile device. Furthermore, the actuator may be manually retracted and/or electronically retracted.

In one configuration, an articulating image director, such as a mirror or image tube, is coupled to the mobile device or the mobile device case to provide a forward facing view and/or rear facing view to the mobile device. In the present application, the articulating image director may be referred to as the image director. The articulating image director may be aligned below the camera of the mobile device and may be moveable via a motor, servo, and/or actuator. In one configuration, the mobile device case and/or the mobile device moves in a specific direction in response to an image captured via the camera. Moreover, in one configuration, the mechanical actuator is a locomotive device or an articulating device, such as treads, wheels, articulating legs, helicopter rotors, propellers and/or any device that manipulates an object.

The aspects described below are based on configurations for the mobile device case. Still, the configurations described below can also extend to the actuator and/or the articulating image director being defined within the mobile device. Additionally, or alternatively, multiple actuators may be specified with one or more actuator coupled to the case and one or more actuator coupled to the mobile device. The mobile device is not limited to a cell phone, aspects of the present disclosure are also contemplated for other devices such as tablets, laptops, laptop-tablet hybrids, and/or other devices that include imaging devices, such as cameras.

As previously discussed, an articulating image director may be coupled to the case and aligned with a field of view of a camera of the mobile device. That is, the mobile device may be positioned in the case with the screen facing up and the rear facing camera aligned with the articulating image director. The rear facing camera refers to the camera of the mobile device that is defined on the surface of the mobile device that is opposite to the screen. Alternatively, if the mobile device includes a forward facing camera, the mobile device may be positioned in the case with the screen facing down and the forward facing camera aligned with the articulating image director. The camera may be configured to capture still images or video.

Figure 1:
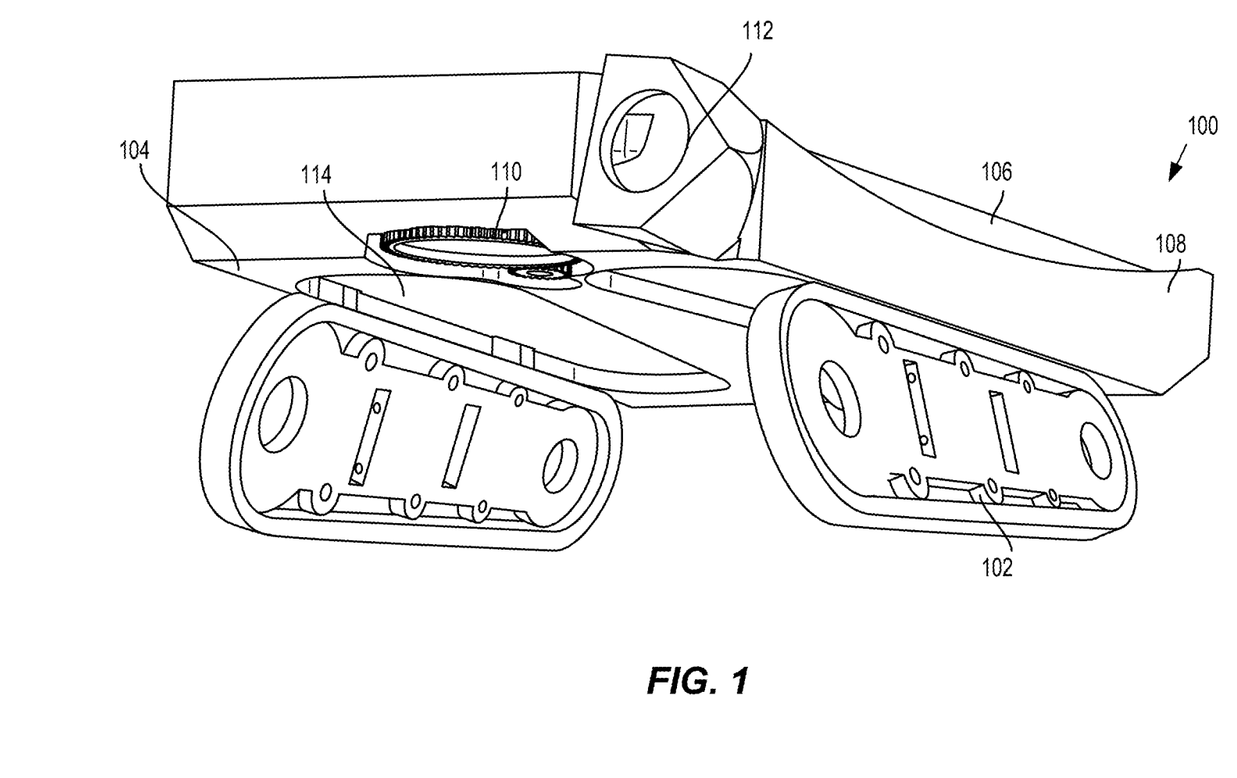
FIGS. 1-5 illustrate different views of a mobile device case comprising retractable mechanical actuators according to aspects of the present disclosure.

FIG. 1 illustrates an example of a case 100 according to an aspect of the present disclosure. As shown in FIG. 1, two retractable mechanical actuators 102 are coupled to the back side 104 of the case 100. The back side 104 refers to a side that is opposite to a side that receives the mobile device 106. Still, aspects of the present disclosure are not limited to the actuators 102 being coupled to the back side 104 of the case 100 as the actuators 102 may be coupled to any area of the case 100, such as the side 108. Moreover, aspects of the present disclosure are not limited to two actuators 102 as any number of actuators 102 is contemplated to manipulate an object.

In one configuration, the actuators 102 manipulate the case 100 and/or other objects. For example, the actuators 102 may provide locomotion to the case 100 by manipulating surrounding objects, such as a surface, and thereby controlling movement of the mobile device 106. In this configuration, the actuators 102 extend from the case 100 to manipulate an object. That is, as shown in FIG. 1, the actuators 102 are extended and are approximately perpendicular with the case 100. The case 100 may include grooves 114 to house the actuators 102 when the actuators 102 are retracted (not shown). Still, as shown in FIG. 1, when extended, the actuators 102 may move to a position to manipulate an object. As previously discussed, actuators 102 may be manually retracted/extended and/or electronically retracted/extended. In one configuration, the actuator is manually extended/retracted via a latch mechanism (not shown). In another configuration, the actuator is electronically extended/retracted via gears (not shown), rotors (not shown), servos (not shown), motors (not shown), and/or other devices (not shown) coupled to the case or mobile device.

Moreover, the actuators 102 are not limited to tread-type actuators 102 as shown in FIG. 1. As previously discussed, aspects of the present disclosure are contemplated for any type of actuator that manipulates an object, such as treads, wheels, articulating legs, propellers and/or helicopter rotors.

As shown in FIG. 1, the case 100 may also house the mobile device 106. Furthermore, a servo 110 may be provided on the case. The servo 110 may be aligned with the camera (not shown) of the mobile device 106. Furthermore, as shown in FIG. 1, an image director 112 is coupled to the case. The image director 112 may be detachable so that it may be coupled with the servo 110 as desired. The servo 110 provides articulation to the image director 112 so that the image director 112 may tilt, pan, and/or rotate. The image director 112 provides a forward facing view and/or rear facing view to the mobile device 106.

Figure 2:
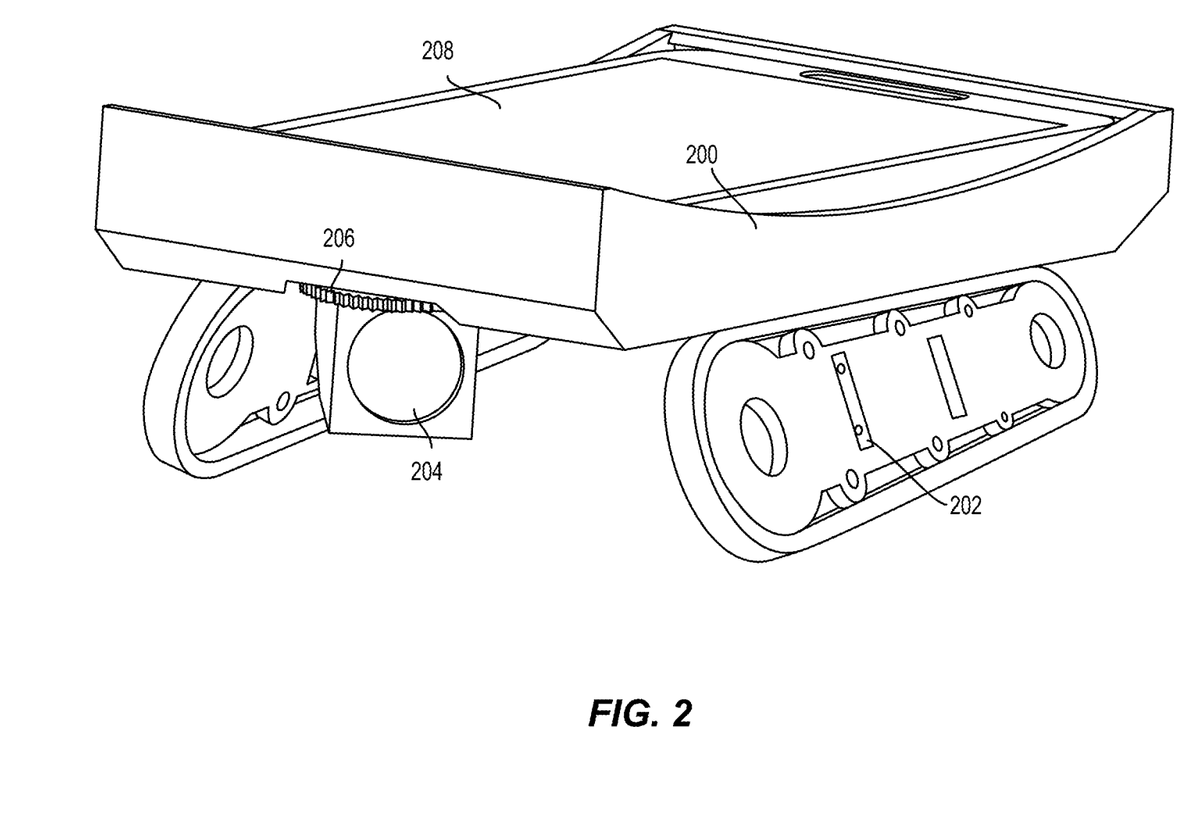

FIG. 2 illustrates an example of a case 200 according to an aspect of the present disclosure. As shown in FIG. 2, two retractable actuators 202 are coupled to the case 200. FIG. 2 also illustrates the image director 204 coupled to a servo 206. The image director 204 may be permanently fixed or detachable. Additionally, or alternatively, the image director 204 may be relatively flush with the case 200 and may be retractable. In one configuration, the image director 204 is substantially aligned with a camera (not shown) of a mobile device 208 to provide a forward facing and/or rear facing view to the camera.

Figure 3:
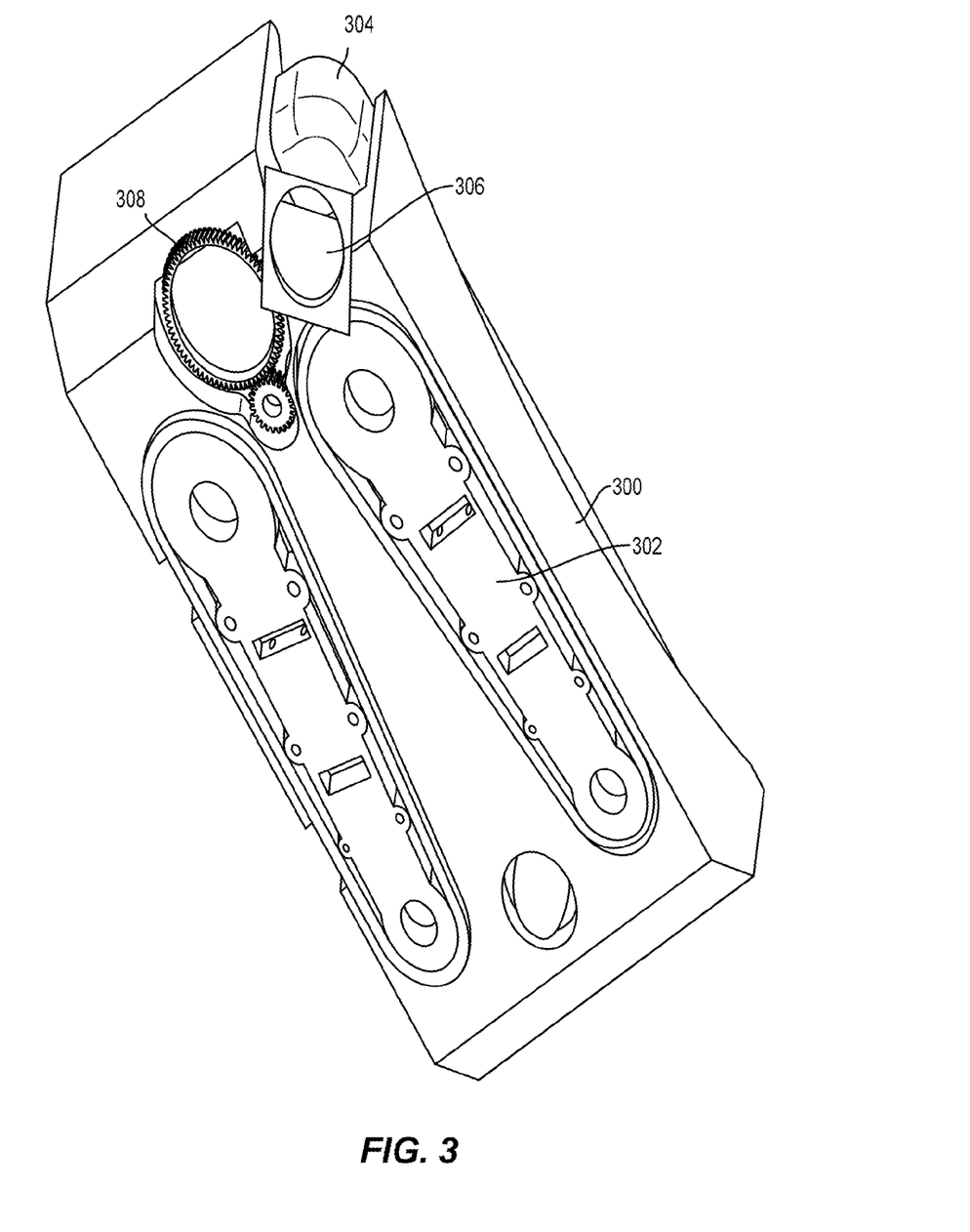

FIG. 3 illustrates an example of a case 300 according to another aspect of the present disclosure. As shown in FIG. 3, the two retractable actuators 302 are coupled to the case 300. In the present example, the actuators 302 are retracted and are positioned to be relatively flush with the case 300. The actuators 302 may be flush so that the case 300 and/or mobile device 304 may be placed in a pocket and/or used as a conventional phone.

Furthermore, as shown in FIG. 3, the image director 306 may be coupled to the case 300. Still, in one configuration, as shown in FIG. 3, the image director 306 is not coupled with the first servo 308. That is, in this configuration, the image director 306 may be coupled to a portion of the case 300 that is distinct from the location of the first servo 308. As previously discussed, the image director 306 may be manipulated by the first servo 308 so that the image director 306 may pan, tilt, and/or sweep. Additionally, or alternatively, as shown in FIG. 3, the case 300 may not cover a portion of the mobile device 304 so that the camera (not shown) of the mobile device is aligned with the articulating image director. Moreover, a second servo (not shown) may also be positioned near the opening of the case 300 to manipulate the image director 306.

Furthermore, in one configuration, multiple openings may be defined in the case to account for the various camera positions of different mobile devices. Accordingly, the image director 306 may be detachable so that the image director 306 may be positioned on the case based on the location of the camera of a specific mobile device. Moreover, in this configuration, a servo may be aligned with each opening to manipulate the image director.

Figure 4:
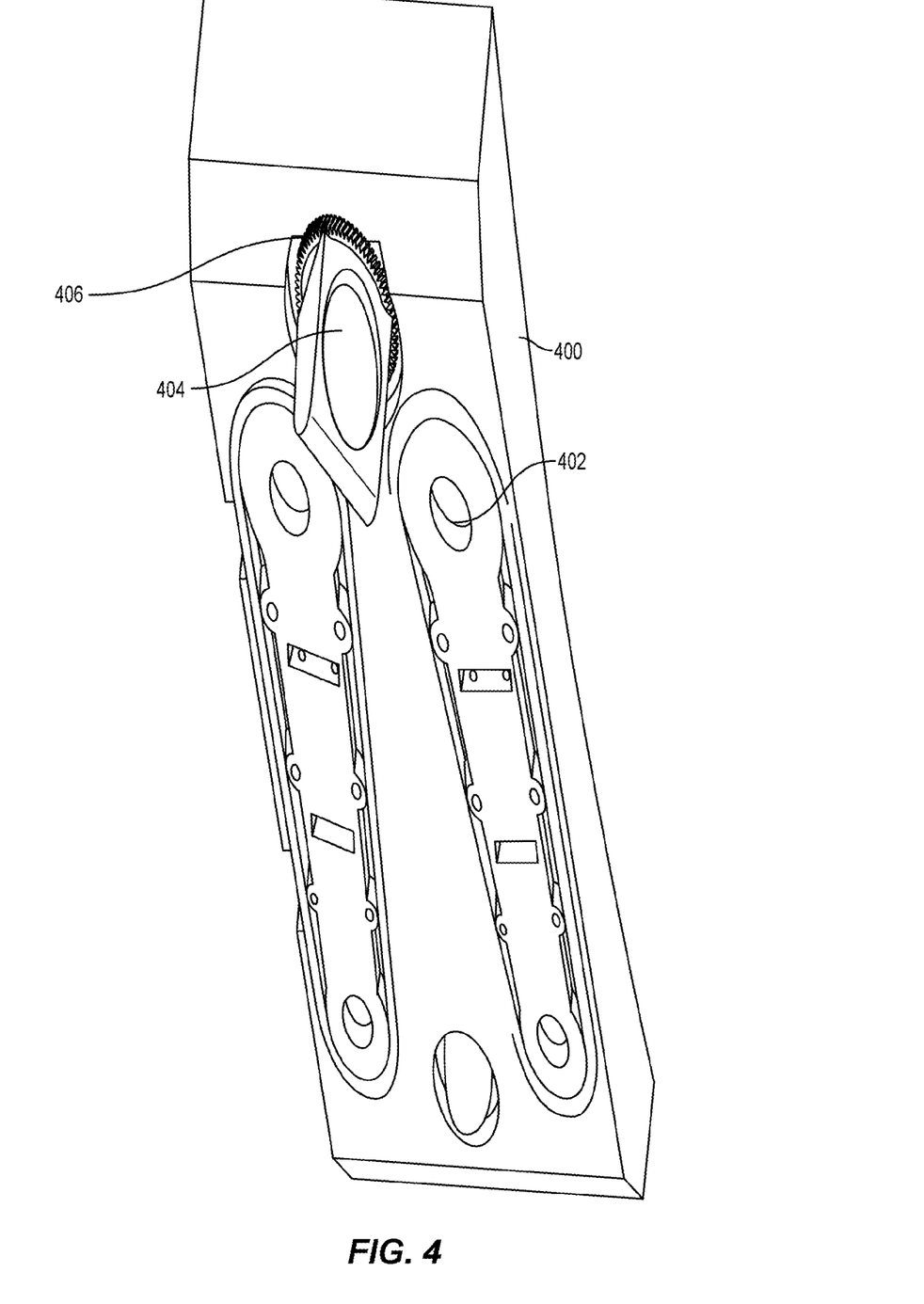

FIG. 4 illustrates an example of a case 400 according to yet another aspect of the present disclosure. As shown in FIG. 4, the two retractable actuators 402 are coupled to the case 400 and an image director 404 is coupled to the servo 406. In this configuration, the image director 404 is coupled to the servo 406 to provide a forward facing view and/or rear facing view to the camera (not shown) of the mobile device (not shown).

Figure 5:
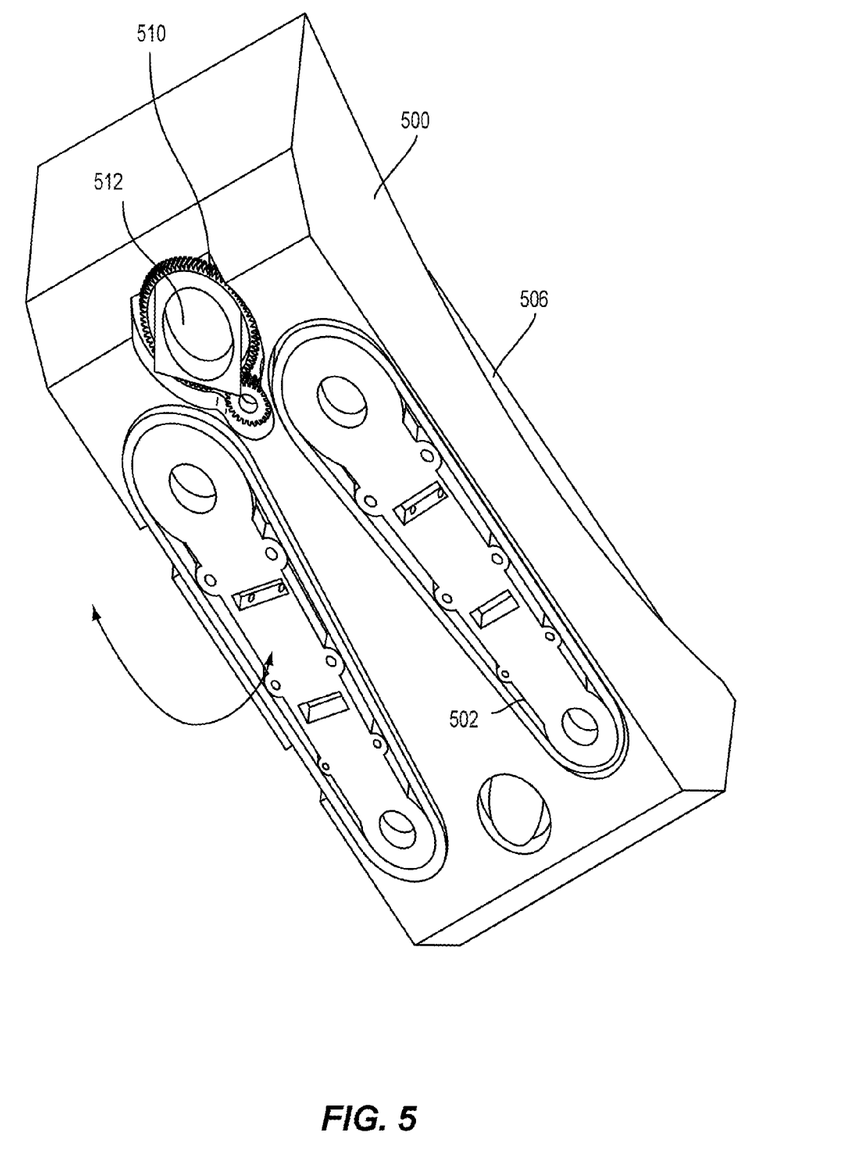

FIG. 5 illustrates an example of a mobile device case 500 according to still another aspect of the present disclosure. As shown in FIG. 5, the two retractable actuators 502 are coupled to the case 500. Furthermore, as shown in FIG. 5, the actuators 502 are relatively flush with the case 500 when the actuators 502 are retracted. FIG. 5 also illustrates the image director 512 being coupled to the servo 510. The image director 512 of FIG. 5 is shown as being relatively flush with the case 500. Similar to the actuators 502, the image director 512 may be flush with the case 500 when not in use.

In one configuration, the case 500 is configured so that the camera (not shown) of the mobile device 506 is substantially aligned with the image director 512. For example, one or more camera openings (not shown) may be defined within the case 500 to receive a camera of the mobile device 506. The camera openings allow the camera to be aligned with the articulating image director. As another example, as shown in FIG. 5, the case 500 may not cover a portion of the mobile device 506 so that the camera is aligned with the image director 512.

In one configuration, the articulating image director may be a mirror, tube, light pipe, fiber optic cable, or other device that allows an image to be directed to the camera. The image director may be set at a specific angle to provide a forward facing view and/or rear facing view to a camera, such as a downward facing camera, of a mobile device. That is, when a camera of a mobile device is aligned with the image director, the camera may provide a forward facing view and/or rear facing from the case. The mobile device may be coupled to the case via a hardwire connection, such as USB, or a wireless connection, such as Bluetooth™. Thus, the mobile device may communicate with the sensors and motors of the case via the wired and/or wireless connection.

Additionally, a sound director may also be specified on the case. The sound director may direct audio output from one or more speakers of the mobile device. Specifically, the sound director is aligned with the speaker of the mobile device so that the audio may be directed to a desired location. The sound director may be a tube or other structure that directs audio waves.

As discussed above, the image director is configured to articulate. Based on an angle and size of the image director, the forward facing view and/or rear facing view may be a ceiling to floor view. One or more servos or motors may be coupled to the image director to provide articulation. That is, the servos or motors may tilt, roll, and/or pan the image director. Additionally, or alternatively, the camera of the mobile device may be configured to pan, adjust its angle, or zoom in and out. Furthermore, in one configuration, the angle/direction of the image director may be adjusted via wireless communication, such as Bluetooth™. Additionally, the image director may have a concave or convex shape to provide different views to the camera. Moreover, the image director may be swappable so that different types of image directors may be aligned with the camera as desired.

As an example, the image director may facilitate a teleconference. That is, the case may be placed on a desk or other surface during a teleconference. The case may be stationary or may move to participants, via the actuators, so that an image of a participant during the teleconference is captured via the image director. Moreover, the mobile device may be specified to use facial recognition to detect the faces of participants in the teleconference. Additionally, searching may be improved in the mobile device based on the facial recognition and/or images captured via the camera.

Furthermore, the low profile of the case provides for an improved interaction with obstacles in the case's environment. That is, the mobile device provides on board vision for the case to avoid obstacles and map the case's environment.

One or more sensors may be provided on the case for improved environmental sensing. The modular motor and actuator arrangement may provide for various wheel configurations, such as four wheel, three wheel, tread drive, and/or mid-wheel configurations.

In one configuration, a ranging device, such as a laser, may provide depth information. That is, the ranging device may be provided on the mobile device or case so that the light of the ranging device reflects off the image director. The camera may determine depth information based on the offset from the intersection of the camera axis. As an example, a laser is provided adjacent to the camera to reflect light off the image director. In another configuration, depth information may be calculated based on stereo imaging. The depth information may be used by applications of the mobile device. In another configuration, the image director may reflect light from a flashlight or LED to illuminate the forward facing direction.

As previously discussed, various types of actuators may be specified for the case. In one configuration, retractable wheels and/or detachable wheels are defined on the housing to provide locomotion to the mobile device. Furthermore, the wheels may be angled to prevent jamming against surfaces and/or scuffing of surfaces. In one configuration, the wheels may be differential drive wheels. Still, aspects of the present disclosure are not limited to wheels and other retractable mechanical actuators may provide locomotion. For example, legs, vibration movement, treads, rotors, and/or omnidirection wheels may provide locomotion. Moreover, the locomotion is not limited to movement on hard surfaces as the actuators may provide locomotion for other environments, such as flight or liquid environments.

The case may be powered by a battery source coupled to the frame of the case. The battery source may include a rechargeable battery, such as a lithium-ion battery, or a disposable battery, such as AAA or AA batteries. The case may also be configured to charge the mobile device. The mobile device may be charged via a hardwired connection and/or inductive charging.

For example, an interface board on the case may provide trickle charging to the case and/or the mobile device. Furthermore, the forward facing view provided via the image director may locate a docking station to charge the mobile device and/or case when the battery is below a threshold. The docking station may be an inductive charger. The contacts for the inductive charging may be defined on a frame and/or actuators of the case.

In another configuration, the actuators are extended (e.g., rearranged) from within the body of the case or mobile device. For example, the body of the mobile device may fold to expose one or more actuators. The actuators may be extended from the folded portion and then positioned to manipulate an object.

As previously discussed, the mobile device may communicate with the sensors and motors of the case via the wired and/or wireless connection. Additionally, the robot may communicate with a user and/or another device that is not coupled to the robot via a wired and/or wireless connection. For example, a user may control the robot with a wired or wireless remote control. The remote control may be another mobile device with software for controlling the robot. The wired connection may be a connection such as USB. The wireless connection may be a connection such as Bluetooth™ or WiFi.

In one configuration, when the mechanical actuator is retracted (i.e., relatively flush with the case) or when the mechanical actuator is detached from the case, the case provides other functionality to the mobile device. For example, the case may be placed on a bookshelf. In this example, to facilitate placement on various surfaces, such as the bookshelf the mechanical actuators are relatively flush with the case or removed from the case. Nonetheless, in this configuration, the image director provides different views to the mobile device while the mobile device remains stationary. The image director attached to the camera may include a pan, tilt, and/or roll mechanism via one or more servos/motors. The image director may include its own power source or may be powered by the case's power supply.

Figure 6:
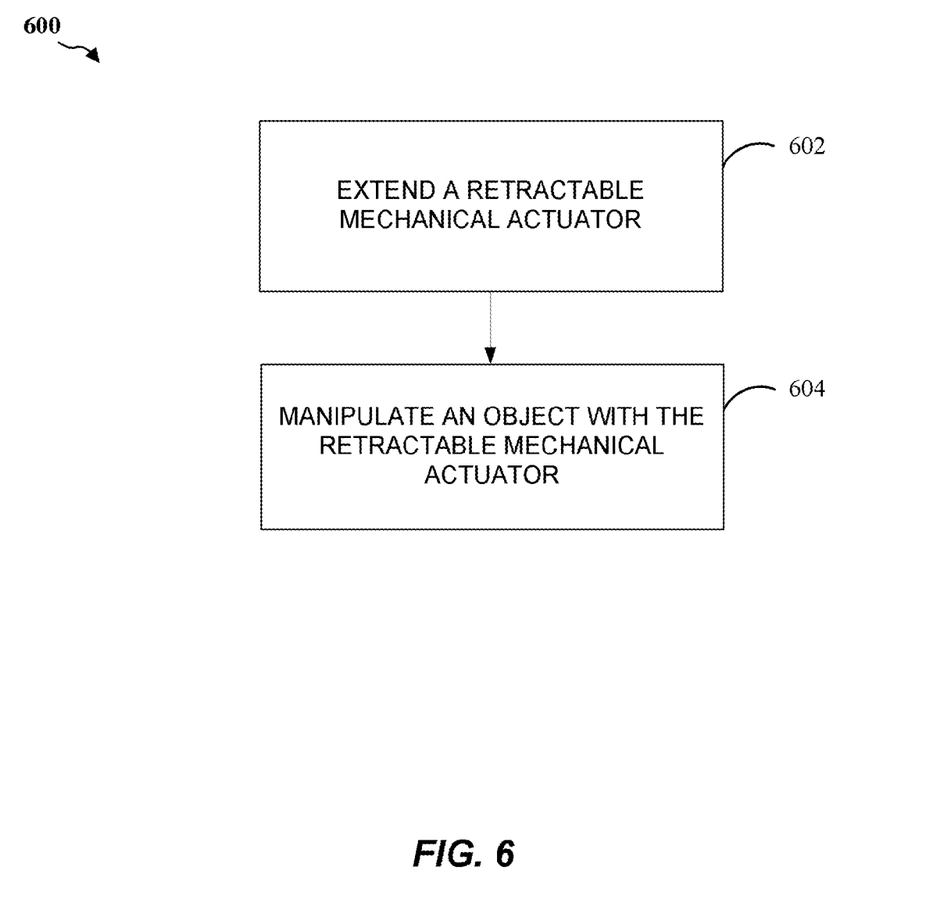
FIG. 6 illustrates a flow chart for controlling a mobile device according to an aspect of the present disclosure.

FIG. 6 illustrates a flow chart 600 for a method of controlling a mobile device in accordance with aspects of the present disclosure. As shown in block 602, a retractable mechanical actuator is extended. The retractable mechanical actuator may be coupled to a mobile device case or the mobile device. As shown in block 602, an object is manipulated by the retractable mechanical actuator when the retractable mechanical actuator is extended. For example, the mobile device case may move. The retractable mechanical actuator is controlled via the mobile device.

Figure 7:
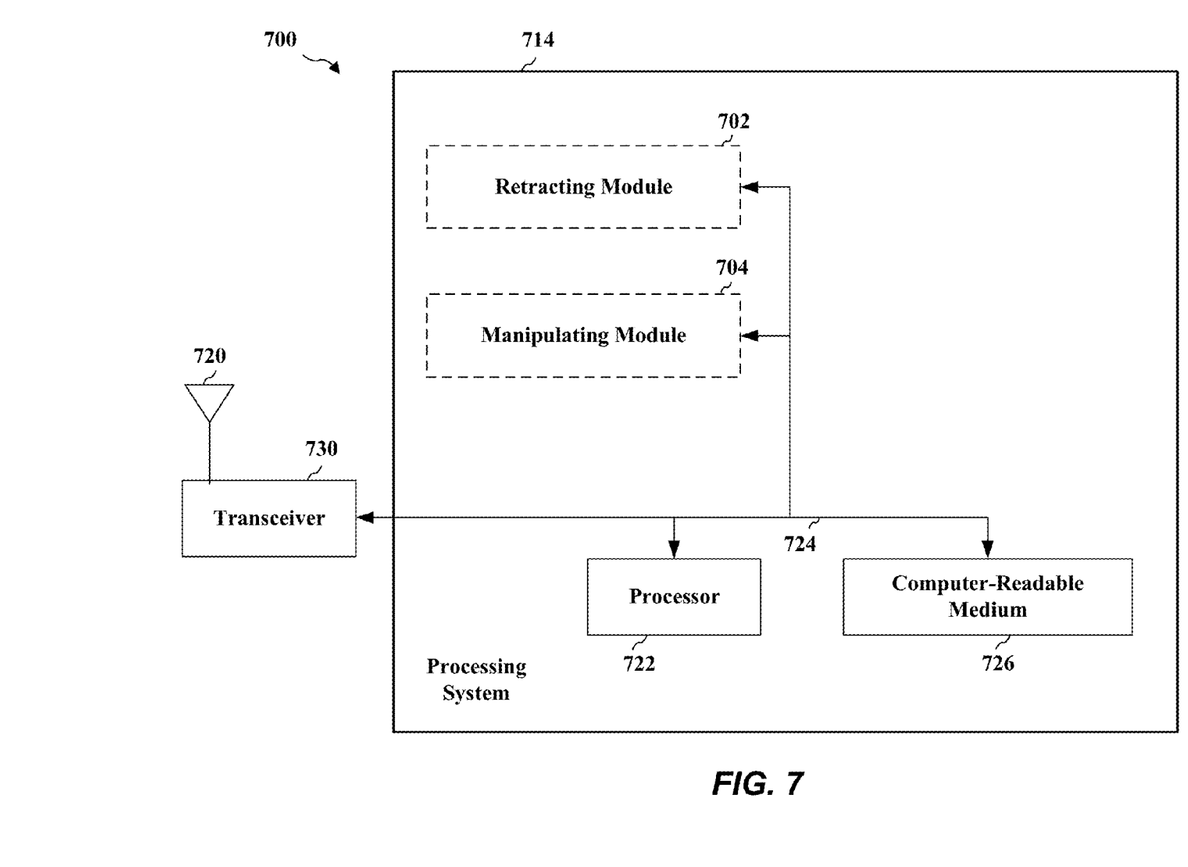
FIG. 7 is a diagram illustrating an example of a hardware implementation for an apparatus employing a processing system according to an aspect of the present disclosure.

FIG. 7 is a diagram illustrating an example of a hardware implementation for an apparatus 700 employing a processing system 714. The processing system 714 may be implemented with a bus architecture, represented generally by the bus 724. The bus 724 may include any number of interconnecting buses and bridges depending on the specific application of the processing system 714 and the overall design constraints. The bus 724 links together various circuits including one or more processors and/or hardware modules, represented by the processor 722 the modules 702, 704 and the computer-readable medium 726. The bus 724 may also link various other circuits such as timing sources, peripherals, voltage regulators, and power management circuits, which are well known in the art, and therefore, will not be described any further.

The apparatus includes a processing system 714 coupled to a transceiver 730. The transceiver 730 is coupled to one or more antennas 720. The transceiver 730 enables communicating with various other apparatus over a transmission medium. The processing system 714 includes a processor 722 coupled to a computer-readable medium 726. The processor 722 is responsible for general processing, including the execution of software stored on the computer-readable medium 726. The software, when executed by the processor 722, causes the processing system 714 to perform the various functions described for any particular apparatus. The computer-readable medium 726 may also be used for storing data that is manipulated by the processor 722 when executing software.

The processing system 714 includes a retracting module 702 for extending a retractable mechanical actuator. The processing system 714 also includes a manipulating module 704 for manipulating an object via the retractable mechanical actuator. The modules 702, 704 may be software modules running in the processor 722, resident/stored in the computer-readable medium 726, one or more hardware modules coupled to the processor 722, or some combination thereof. The processing system 714 may be a component of a mobile device, such as the mobile device 106, or a mobile device case, such as the mobile device case 100.

In one configuration, a mobile device case, such as the robot mobile device case, or a mobile device, is configured with a means for extending a retractable mechanical actuator. In one aspect, the extending means may be servos, motors, and/or gears coupled to the mobile device and/or the mobile device case. Additionally, or alternatively, the extending means may be the retracting module 702. The mobile device case and/or the mobile device are also configured to include a means for manipulating. In one aspect, the manipulating means may be the retractable mechanical actuator and/or the manipulating module 704. In another aspect, the aforementioned means may be any module or any apparatus configured to perform the functions recited by the aforementioned means.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art. Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. In addition, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A mobile device case, the mobile device case comprising:
    a housing arranged to retain a hand-held mobile device configured for wireless communication;
    an articulating image director, aligned with a field of view of a camera of the hand-held mobile device, to provide a view of a forward direction or a rear direction of the mobile device case to the camera, the housing having an opening to allow the articulating image director to align with the field of view of the camera; and
    a plurality of retractable mechanical actuators configured:
        to retract to a first position that is substantially flush with the mobile device case,
        to extend to a second position that is different from the first position, and
        to manipulate a first object, while in the second position, based on at least one of: a second object viewed by the camera, a movement viewed by the camera, or a combination thereof.

2. The mobile device case of claim 1, in which the plurality of retractable mechanical actuators are locomotive devices or articulating devices.

3. The mobile device case of claim 1, in which the plurality of retractable mechanical actuators are at least one of manually retractable, electronically retractable, or a combination thereof.

4. A hand-held mobile device configured for wireless communication, the hand-held mobile device comprising:
    an articulating image director, aligned with a field of view of a camera of the hand-held mobile device, to provide a view of a forward direction or a rear direction of the hand-held mobile device to the camera; and
    a plurality of retractable mechanical actuators configured:
        to retract to a first position that is substantially flush with the hand-held mobile device,
        to extend to a second position that is different from the first position, and
        to manipulate a first object, while in the second position, based on at least one of: a second object viewed by the camera, a movement viewed by the camera, or a combination thereof.

5. The mobile device of claim 4, in which the plurality of retractable mechanical actuators are locomotive devices or articulating devices.

6. The mobile device of claim 4, in which the plurality of retractable mechanical actuators are at least one of manually retractable, electronically retractable, or a combination thereof.

7. A method for controlling a hand-held mobile device, the method comprising:
    viewing a forward direction or a rear direction of the hand-held mobile device via a camera of the hand-held mobile device aligned with an articulating image director;
    extending a plurality of retractable mechanical actuators from a first position that is substantially flush with a mobile device case configured to house the hand-held mobile device or the hand-held mobile device to a second position that is different from the first position; and
    manipulating a first object with the plurality of retractable mechanical actuators, when the plurality of retractable mechanical actuators are in the second position, based on at least one of: a second object viewed by the camera, a movement viewed by the camera, or a combination thereof.

8. The method of claim 7, in which the camera is used for facial recognition.

9. The method of claim 7, in which the plurality of retractable mechanical actuators are at least one of manually retractable, electronically retractable, or a combination thereof.

10. A non-transitory computer-readable medium having program code recorded thereon for controlling a hand-held mobile device, the program code comprising:
    program code to view a forward direction or a rear direction of the hand-held mobile device via a camera of the hand-held mobile device aligned with an articulating image director;
    program code to extend a plurality of retractable mechanical actuators from a first position that is substantially flush with a mobile device case configured to house the hand-held mobile device or the hand-held mobile device to a second position that is different from the first position; and
    program code to manipulate a first object with the plurality of retractable mechanical actuators, when the plurality of retractable mechanical actuators are in the second position, based on at least one of: a second object viewed by the camera, a movement viewed by the camera, or a combination thereof.

11. The non-transitory computer-readable medium of claim 10, in which the camera is used for facial recognition.

12. The non-transitory computer-readable medium of claim 10, in which the plurality of retractable mechanical actuators are at least one of manually retractable, electronically retractable, or a combination thereof.

13. An apparatus comprising:
means for housing a hand-held mobile device configured for wireless communication;
means for image directing, aligned with a field of view of a camera of the hand-held mobile device, to provide a view of a forward direction or a rear direction of the apparatus to the camera, the housing means having an opening so that the camera is aligned with the image directing means; and
a plurality of retractable mechanical actuators configured:
to retract to a first position that is substantially flush with the apparatus;
to extend to a second position that is different from the first position; and
to manipulate a first object, while in the second position, based on at least one of: a second object viewed by the camera, a movement viewed by the camera, or a combination thereof.

14. The apparatus of claim 13, in which the plurality of retractable mechanical actuators provide locomotion to the apparatus.

15. The apparatus of claim 13, in which the plurality of retractable mechanical actuators are further configured to articulate.

16. The apparatus of claim 13, in which the plurality of retractable mechanical actuators are at least one of manually retractable, electronically retractable, or a combination thereof.

* * * * *